(12) United States Patent
Tkachenko

(10) Patent No.: US 8,886,455 B2
(45) Date of Patent: Nov. 11, 2014

(54) NAVIGATION APPARATUS, AUDIBLE INSTRUCTION GENERATION SYSTEM AND METHOD OF GENERATING AUDIBLE INSTRUCTIONS

(75) Inventor: Serhiy Tkachenko, Amsterdam (NL)

(73) Assignee: TomTom International B.V., Amsterdam (NL)

( * ) Notice: Subject to any disclaimer, the term of this patent is extended or adjusted under 35 U.S.C. 154(b) by 29 days.

(21) Appl. No.: 13/516,745

(22) PCT Filed: Dec. 17, 2009

(86) PCT No.: PCT/EP2009/067453
§ 371 (c)(1),
(2), (4) Date: Jun. 29, 2012

(87) PCT Pub. No.: WO2011/072743
PCT Pub. Date: Jun. 23, 2011

(65) Prior Publication Data
US 2012/0265436 A1    Oct. 18, 2012

(51) Int. Cl.
*G01C 21/36* (2006.01)
*G06F 15/16* (2006.01)

(52) U.S. Cl.
CPC .................................. *G01C 21/3629* (2013.01)
USPC .......................................... 701/438; 701/431

(58) Field of Classification Search
USPC .......................................... 701/438, 431, 211
See application file for complete search history.

(56) References Cited

U.S. PATENT DOCUMENTS

| 5,177,685 A | 1/1993 | Davis et al. |
| 6,498,985 B1 | 12/2002 | Petzold |
| 7,664,598 B2 * | 2/2010 | Yamamoto et al. ........... 701/438 |
| 8,065,078 B2 * | 11/2011 | Tashev et al. ................. 701/437 |
| 2005/0071082 A1 * | 3/2005 | Ohmura et al. ............... 701/211 |
| 2008/0243385 A1 * | 10/2008 | Yamamoto et al. ........... 701/300 |
| 2009/0043497 A1 * | 2/2009 | Tashev et al. ................. 701/209 |

FOREIGN PATENT DOCUMENTS

| EP | 0837434 A1 | 4/1998 |
| GB | 2413021 A | 10/2005 |
| JP | 2004093444 A | 3/2004 |

OTHER PUBLICATIONS

International Search Report issued Aug. 20, 2010 for International Application No. PCT/EP2009/067453.

* cited by examiner

*Primary Examiner* — Mary Cheung
*Assistant Examiner* — Michael Berns

(57) ABSTRACT

A navigation apparatus (200) comprises a processing resource (202) arranged to support an operating environment and a route follower (256) supported by the operating environment and arranged to monitor progression, when in use, along a route to be followed. The apparatus also comprises an instruction generator (260) supported by the operating environment and arranged to determine an identity of a location in advance of the location being reached where a manoeuvre has to be executed in order to continue following the route, and to generate manoeuvre data in relation to the manoeuvre. The apparatus further comprises a voice command generator (266) supported by the operating environment and arranged to obtain the manoeuvre data and to generate in response to the manoeuvre data voice instruction data for reproduction by a loudspeaker (276) as an audible voice instruction. The manoeuvre data comprises route manoeuvre instruction component data and supplementary descriptive instruction component data.

17 Claims, 10 Drawing Sheets

NAVIGATION APPARATUS, AUDIBLE INSTRUCTION GENERATION SYSTEM AND METHOD OF GENERATING AUDIBLE INSTRUCTIONS

CROSS CROSS-REFERENCES TO RELATED APPLICATIONS

This application is the National Stage of International Application No. PCT/EP2009/067453, filed on Dec. 17, 2009 and designating the United States. The entire content of this application is incorporated herein by reference.

FIELD OF THE INVENTION

The present invention relates to a navigation apparatus of the type that, for example, is capable of generating audible instructions in relation to a route to be followed. The present invention also relates to an audible instruction generation system of the type that, for example, generates audible instructions in relation to a route to be followed. The present invention further relates to a method of providing audible instructions for a navigation apparatus, the method being of the type that, for example, generates audible instructions in relation to a route to be followed.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems.

In general terms, a modern PND comprises a processor, memory and map data stored within said memory. The processor and memory cooperate to provide an execution environment in which a software operating system is typically established, and additionally it is commonplace for one or more additional software programs to be provided to enable the functionality of the PND to be controlled, and to provide various other functions.

Typically, these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but can be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example BLUETOOTH™, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

The device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking), are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile telephone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server with which the user's computing resource is communicating calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

As mentioned above, it is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated, a simple instruction such as "turn left in 100 m" requires significant processing and analysis. As previously mentioned, user interaction with the device may be by a touch screen, or additionally or alternately by steering column mounted remote control, by voice activation or by any other suitable method.

Devices of the type described above, for example the GO 940 LIVE model manufactured and supplied by TomTom International B.V., provide a reliable means for enabling users to navigate from one position to another. Such devices are of great utility when the user is not familiar with the route to the destination to which they are navigating.

In relation to the provision of audible instructions by the navigation function, current voice navigation instructions match road topology faithfully, for example "In 100 meters, turn left". As can be seen, the audible description of a manoeuvre is constrained to a geospatial feature theme relating to roads. Consequently, the audible description adheres strictly to transportation or navigation network data, for example roads intersections, junctions and roundabouts. In some circumstances, providing such basic manoeuvre instructions can be ambiguous or insufficiently detailed in order to enable a user of the navigation apparatus to execute the manoeuvre in a manner required to follow a route calculated by the navigation function, especially in cities with a large number of small streets, for example narrow and/or short streets. Furthermore, the user may be unable to discern any additional information from a map display to provide clarity. As a result of such a lack of information, the user can manoeuvre "off-route" resulting in possible delays to a journey, a need to re-calculate a route and/or inconvenience to a user.

SUMMARY OF THE INVENTION

According to a first aspect of the present invention, there is provided a navigation apparatus comprising: a processing resource arranged to support an operating environment; a route follower supported by the operating environment and arranged to monitor progression, when in use, along a route to be followed; an instruction generator supported by the operating environment and arranged to determine an identity of a location in advance of the location being reached where a manoeuvre has to be executed in order to continue following the route, and to generate manoeuvre data in relation to the manoeuvre; and a voice command generator supported by the operating environment and arranged to obtain the manoeuvre data and to generate in response to the manoeuvre data voice instruction data for reproduction by a loudspeaker as an audible voice instruction; wherein the manoeuvre data comprises route manoeuvre instruction component data and supplementary descriptive instruction component data.

The supplementary descriptive instruction component data may relate to an environmental geospatial feature.

The instruction generator may be arranged to generate the manoeuvre data by obtaining the manoeuvre instruction component data; the manoeuvre instruction component data may be in respect of a transportation or navigation network, and identifying a geospatial feature relating to the location of the forthcoming manoeuvre.

The instruction generator may be arranged to identify the geospatial feature relating to the location of the forthcoming manoeuvre by identifying a geospatial feature relating to the location such that the geospatial feature supplements any geospatial features identified in the route manoeuvre instruction component data in a non-repetitive manner.

In addition to the location of the forthcoming manoeuvre, the instruction generator may be arranged to identify the geospatial feature so as to relate to a current location of the navigation apparatus.

The geospatial feature may have a category of information associated therewith; the category of information may be a non-transportation or navigation network category.

The instruction generator may be arranged to determine a physical attribute of the geospatial feature.

The apparatus may further comprise an external source interface module for procuring geospatial feature data stored externally to the navigation apparatus. The external source interface module may be arranged to generate a search query in order to find a geospatial feature associated with the location of the forthcoming manoeuvre. The search query may be constructed for a search engine.

The external source interface module may be arranged to download map-related data, for example Point of Interest data. The external source interface module may be arranged to download map update data.

The external source interface module may be arranged to download three-dimensional data. Additionally or alternatively, the external source interface module may be arranged to download texture data.

The external source interface module may be arranged to download an image associated with the location of the forthcoming manoeuvre.

The apparatus may further comprise an image processing engine arranged to recognise a geospatial feature in the image.

The image processing engine may be arranged to determine a physical attribute of the recognised geospatial feature.

The physical attribute may relate to a dimension of the geospatial feature.

The physical attribute may be derived from three-dimensional data associated with the geospatial feature.

The apparatus may further comprise a database of geospatial data comprising the three-dimensional data.

The physical attribute may be derived from texture data associated with the geospatial feature.

The apparatus may further comprise a text-to-speech engine arranged to translate a name associated with the geospatial feature into audible reproduction data when predefined audible reproduction data is not available in relation to the name associated with the geospatial feature.

According to a second aspect of the present invention, there is provided an audible instruction generation system comprising: a navigation apparatus as set forth above in relation to the first aspect of the invention; and a data resource, the data resource being accessible by the navigation apparatus via a wireless communications network and constituting a source of the supplementary descriptive instruction component data.

According to a third aspect of the present invention, there is provided a method of providing voice instructions for a navigation apparatus, the method comprising: monitoring progression along a route to be followed; determining an identity of a location in advance of the location being reached where a manoeuvre has to be executed in order to continue following the route; generating manoeuvre data in relation to the manoeuvre; obtaining the manoeuvre data; and generating in response to the manoeuvre data voice instruction data for reproduction by a loudspeaker as an audible voice instruction; wherein the manoeuvre data comprises route manoeuvre instruction component data and supplementary descriptive instruction component data.

According to a fourth aspect of the present invention, there is provided a computer program element comprising computer program code means to make a computer execute the method as set forth above in relation to the third aspect of the invention.

The computer program element may be embodied on a computer readable medium.

It is thus possible to provide an apparatus, system and method that provide improved audible instructions of enhanced factual clarity to a user of the navigation apparatus. The improved audible instructions therefore minimise instances where the user does not execute a manoeuvre as intended by the navigation apparatus. Delays to a journey are thus minimised. The ability to minimise delay reduces inconvenience to the user. Also, by obviating the need for the navigation apparatus to perform a route recalculation in order to maintain navigation to a selected destination following an incorrectly executed manoeuvre, driver workload is reduced and hence also driver safety.

Other advantages of these embodiments are set out hereafter, and further details and features of each of these embodiments are defined in the accompanying dependent claims and elsewhere in the following detailed description.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
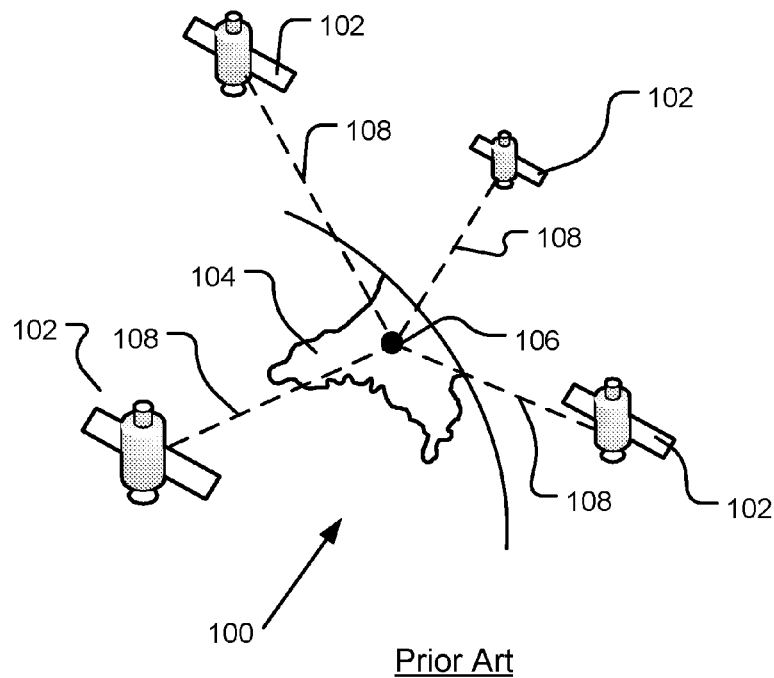
FIG. 1 is a schematic illustration of an exemplary part of a Global Positioning System (GPS) usable by a navigation apparatus.

Throughout the following description identical reference numerals will be used to identify like parts.

One or more embodiments of the present invention will now be described with particular reference to a PND. It should be remembered, however, that the teachings herein are not limited to PNDs but are instead universally applicable to any type of electronic processing device capable of determining a location thereof, for example but not essentially those configured to execute navigation software in a portable and/or mobile manner so as to provide route planning and navigation functionality. It follows therefore that in the context of the embodiments set forth herein, an electronic apparatus is intended to include (without limitation) any type of route planning and navigation apparatus, irrespective of whether that device is embodied as a PND, a vehicle such as an automobile, or indeed a portable computing resource, for example a portable personal computer (PC), a mobile telephone or a Personal Digital Assistant (PDA) executing, for example, route planning and navigation software. Indeed, a mobile telephone, smartphone, a music player, such as an MP3 player, or the like can simply be employed in respect of some embodiments without the benefit of route planning or navigation software.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be, determined with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. As mentioned above, the GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
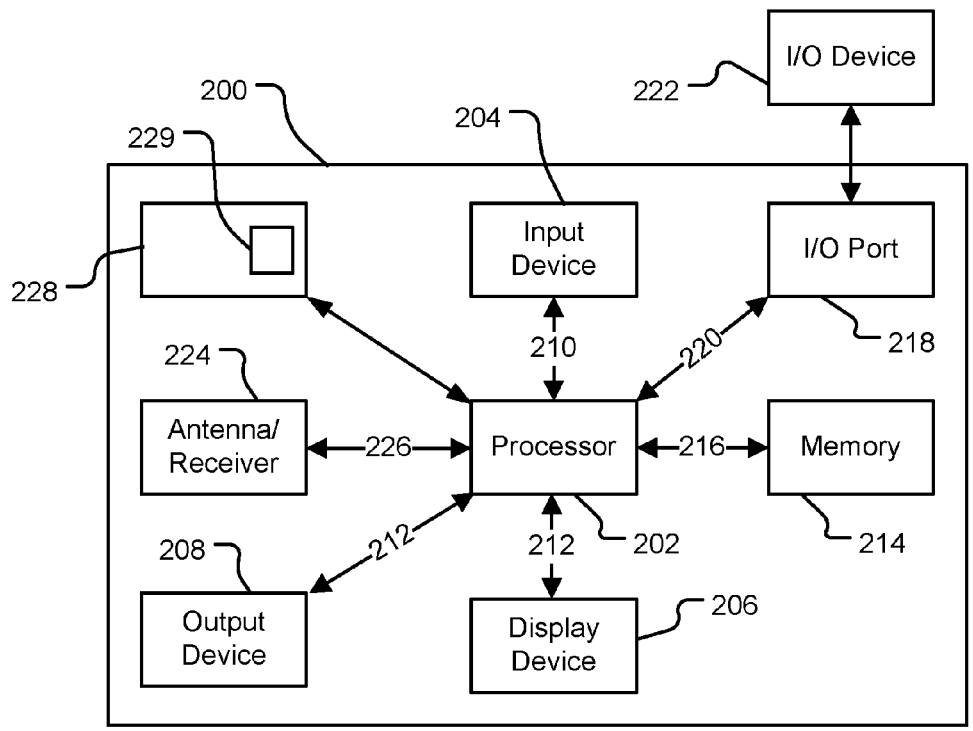
FIG. 2 is a schematic diagram of electronic components of a navigation apparatus constituting an embodiment of the invention.

Referring to FIG. 2, it should be noted that the block diagram of the navigation apparatus 200 is not inclusive of all components of the navigation apparatus, but is only representative of many example components. The navigation apparatus 200 is located within a housing (not shown). The navigation apparatus 200 includes a processing resource, for example a processor 202, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

Figure 3:
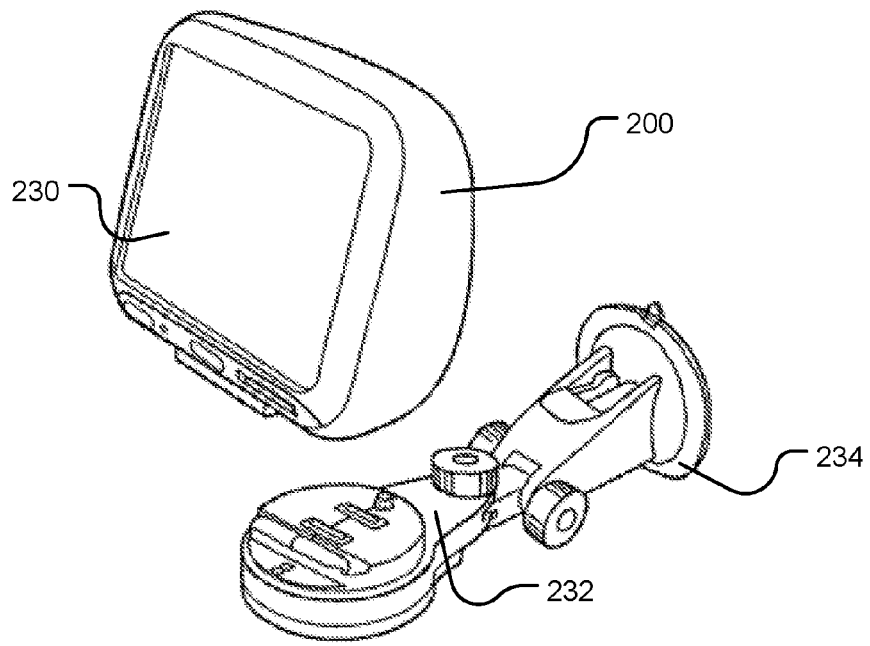
FIG. 3 is a schematic diagram of a docking arrangement for optional use in a vehicle.

In one arrangement, one aspect of the input device 204, the touch panel, and the display screen 206 are integrated so as to provide an integrated input and display device, including a touchpad or touchscreen input 230 (FIG. 3) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation apparatus 200, the processor 202 is operatively connected to and capable of receiving input information from input device 204 via a connection 210, and operatively connected to at least one of the display screen 206 and an output device 208, via respective output connections 212, to output information thereto. The output device 208 is, for example, an audible output device (e.g. including a loudspeaker). As the output device 208 can produce audible information for a user of the navigation apparatus 200, it should equally be understood that input device 204 can include a microphone and software for receiving input voice commands as well. Further, the navigation apparatus 200 can also include any additional input device 204 and/or any additional output device, such as audio input/output devices. The processor 202 is operably coupled to a memory resource 214 via connection 216 and is further adapted to receive/send information from/to input/output (I/O) ports 218 via connection 220, wherein the I/O port 218 is connectible to an I/O device 222 external to the navigation apparatus 200. The memory resource 214 comprises, for example, a volatile memory, such as a Random Access Memory (RAM) and a non-volatile memory, for example a digital memory, such as a flash memory. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones.

FIG. 2 further illustrates an operative connection between the processor 202 and an antenna/receiver 224 via connection 226, wherein the antenna/receiver 224 can be a GPS antenna/receiver for example. It should be understood that the antenna and receiver designated by reference numeral 224 are combined schematically for illustration, but that the antenna and receiver may be separately located components, and that the antenna can be a GPS patch antenna or helical antenna for example.

In order to support communications in a Universal Mobile Telecommunications System (UMTS), the processor 202 is also coupled to a cellular communications module 228 constituting the mobile telephone technology mentioned above. The cellular communications module 228 supports a communications interface 229 for transmitting and receiving data wirelessly. The cellular communications module 228 comprises a Subscriber Identity Module (SIM) (not shown) coupled thereto having a data subscription associated therewith. The subscription is, in this example, for a limited data usage over a pre-determined period of time, for example a calendar month. In other embodiments, the subscription need not have a data usage limit. The cellular communications module 228 supports a bidirectional data communications service, for example a packet switched data service, such as a General Packet Radio Service (GPRS) supported by the GSM communications network and/or a High Speed Downlink Packet Access (HSDPA) service supported by the UMTS network. The communications interface 229 is therefore compatible with the bidirectional data communications service. The bidirectional data communications service supports an Internet Protocol (IP) for data communications although use of other protocols is contemplated.

In this example, the navigation apparatus 200 comprises the cellular communications module 228. However, in another embodiment, a data session can be established, if required, with the communications network via a separate wireless communications terminal (not shown), such as a mobile telephone, PDA, and/or any device with mobile telephone technology, in order to establish a digital connection, for example a digital connection via known BLUETOOTH™ technology. In this respect, the navigation apparatus 200 can be BLUETOOTH™ enabled in order that the navigation apparatus 200 can be agnostic to the settings of the wireless communications terminal, thereby enabling the navigation apparatus 200 to operate correctly with the ever changing range of mobile telephone models, manufacturers, etc. Model/manufacturer specific settings can, for example, be stored by the navigation apparatus 200, if desired.

It will, of course, be understood by one of ordinary skill in the art that the electronic components shown in FIG. 2 are powered by one or more power sources (not shown) in a conventional manner. As will be understood by one of ordinary skill in the art, different configurations of the components shown in FIG. 2 are contemplated. For example, the components shown in FIG. 2 can be in communication with one another via wired and/or wireless connections and the like. Thus, the navigation apparatus 200 described herein can be a portable or handheld navigation apparatus.

To facilitate use thereof, the portable or handheld navigation apparatus 200 of FIG. 2 can be connected or "docked" (FIG. 3) in a known manner in an automobile, or any other suitable vehicle, for example to a bicycle, a motorbike or a boat. The navigation apparatus 200 is then removable from the docked location for portable or handheld navigation use.

The navigation apparatus 200 can sit on an arm 232, which itself can be secured to a vehicle dashboard/window/etc. using a suction cup 234. This arm 232 is one example of a docking station to which the navigation apparatus 200 can be docked. The navigation apparatus 200 can be docked or otherwise connected to the arm 232 of the docking station by snap connecting the navigation apparatus 200 to the arm 232 for example. The navigation apparatus 200 may then be rotatable on the arm 232. To release the connection between the navigation apparatus 200 and the docking station, a button (not shown) on the navigation apparatus 200 may be pressed, for example. Other equally suitable arrangements for coupling and decoupling the navigation apparatus 200 to a docking station are well known to persons of ordinary skill in the art.

Figure 4:
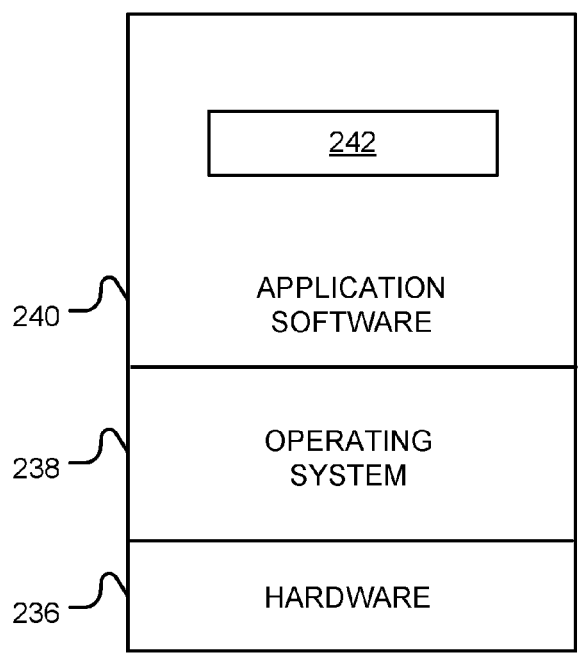
FIG. 4 is a schematic representation of an architectural stack employed by the navigation apparatus of FIG. 2.

Turning to FIG. 4, the memory resource 214 of the navigation apparatus 200 stores a boot loader program (not shown) that is executed by the processor 202 in order to load an operating system 238 from the memory resource 214 for execution by functional hardware components 236, which provides an environment in which application software 240 can run. The operating system 238 serves to control the functional hardware components 236 and resides between the application software 240 and the functional hardware components 236. The application software 240 provides an operational environment including the GUI that supports core functions of the navigation apparatus 200, for example map viewing, route planning, navigation functions and any other functions associated therewith. In this example, in order to implement the alert content reception apparatus, the application software 240 supports a navigation module 242.

Figure 5:
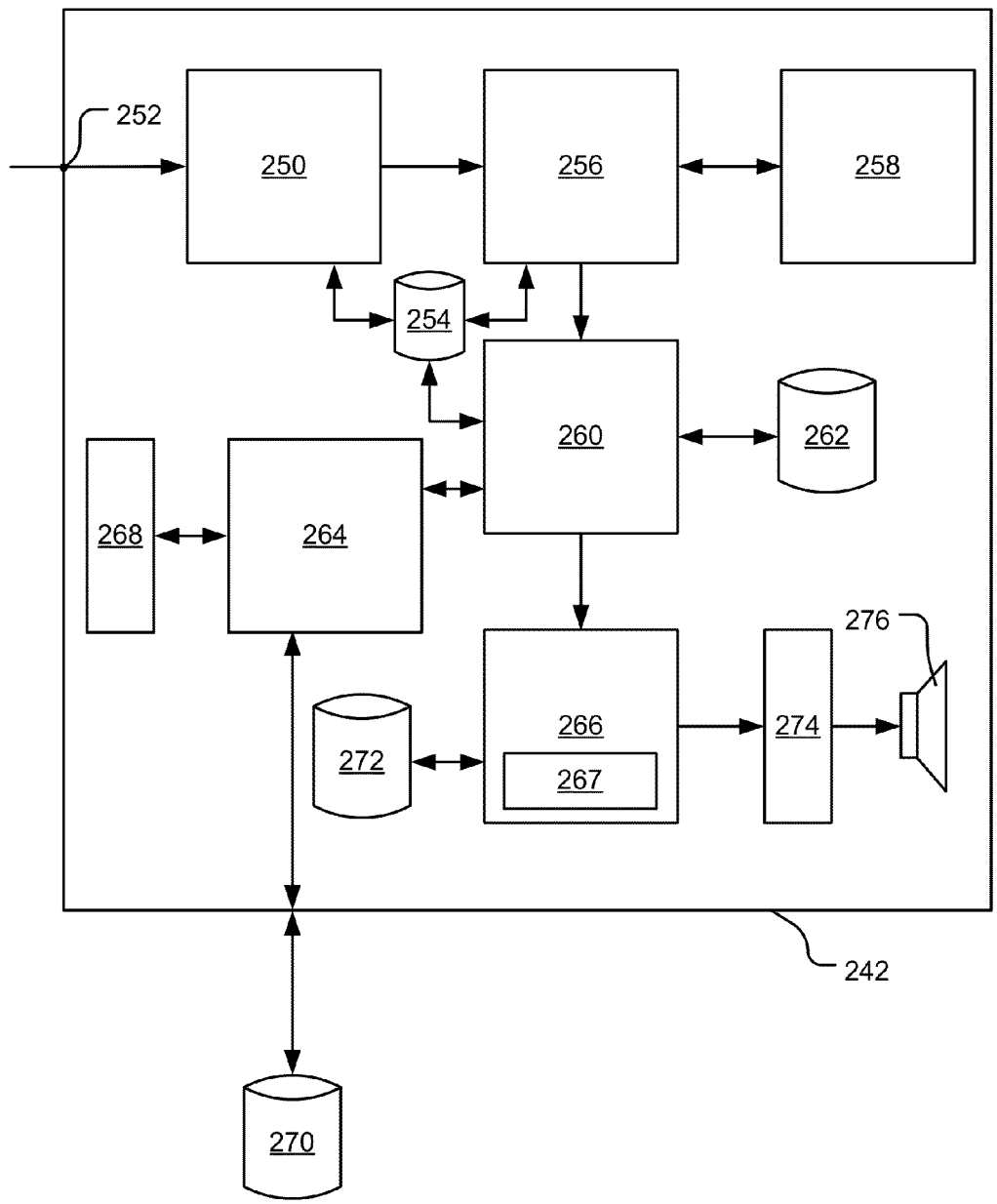
FIG. 5 is a schematic diagram of a navigation module of FIG. 4 in greater detail.

Referring to FIG. 5, the navigation module 242 comprises a route calculator 250 having an input 252 for receiving route calculation parameters from a navigation input module (not shown), for example a start location and a destination location. The route calculator 250 has access to a map database 254 comprising geospatial data. The route calculator 250 is also operably coupled to a route follower 256, the route follower 256 also having access to the map database 254. The route follower 256 is operably coupled to a GPS data module 258. The route follower 256 is also operably coupled to an instruction generator 260, the instruction generator 260 having access to a local database of manoeuvre data 262. The instruction generator 260 is also operably coupled to an external source interface module 264 and a voice command generator 266. In this example, the voice command generator 266 comprises a text-to-speech data engine 267.

The external source interface module 264 is operably coupled to an image processing engine 268 and, in this example, has access to an external resource 270, for example a remote data store and/or a search engine. The voice command generator 266 has access to a voice data database 272, the voice command generator 266 also being operably coupled to a loudspeaker interface 274. The loudspeaker interface 274 is coupled to a loudspeaker 276 constituting one of the output devices 208.

Figure 6:
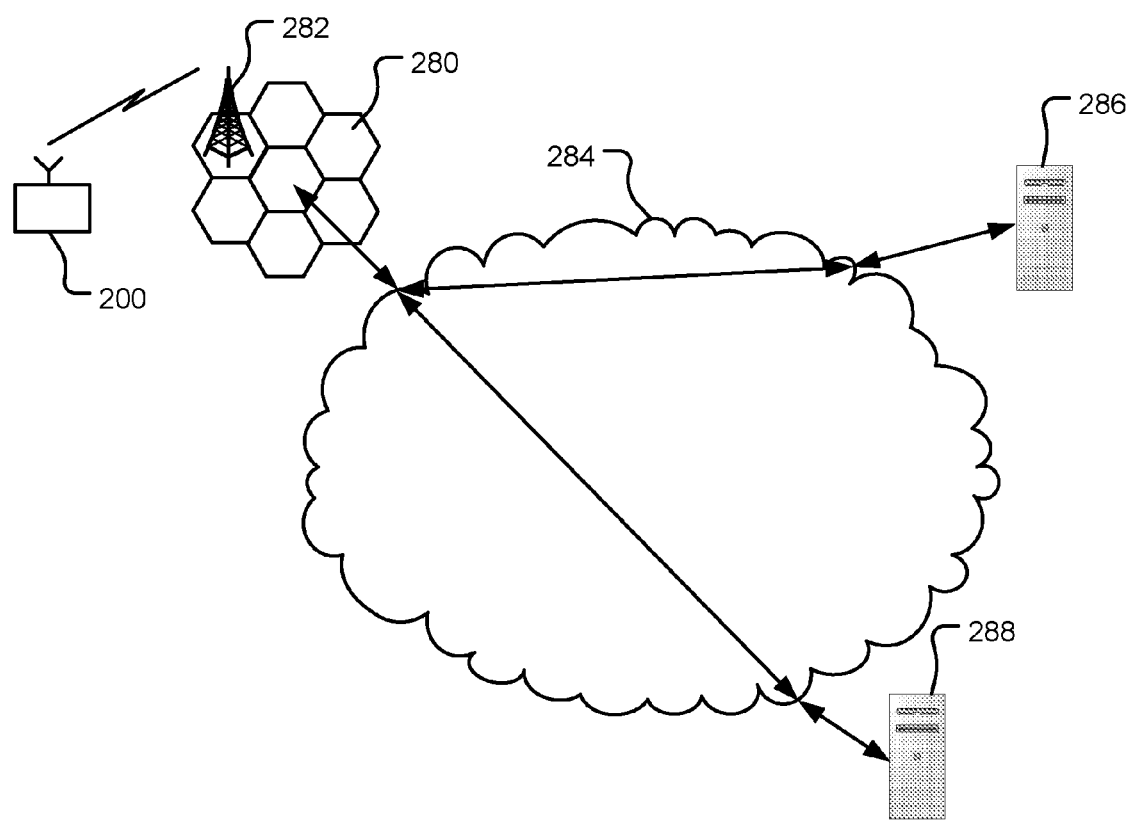
FIG. 6 is a schematic diagram of an audible instruction generation system comprising the navigation apparatus of FIG. 2.

Turning to FIG. 6, the navigation apparatus 200 is capable of communicating with a cellular communications network 280, for example the UMTS network mentioned above, via one or more Node Bs 282 thereof. Whilst reference herein is made to the UMTS network, the skilled person should appreciate that the embodiments described herein are not limited to the UMTS network and use of other wireless communications networks is contemplated.

The cellular communications network 280 is operably coupled to the Internet 284. A first remote server 286 is "attached" to the Internet 284 via an Internet Service Provider (ISP) and constitutes an example of the external resource 270. Similarly, in this example, a second remote server 288, supporting an Internet search engine, is also "attached" to the Internet 284.

As explained above, the establishment of the network connection between the navigation apparatus 200 (via a service provider) and another device, for example the first and/or second remote servers 286, 288, using the Internet 284, can be done in any suitable known manner. In this respect, any number of appropriate data communications protocols can be employed. Furthermore, the communications module 228 can utilize any number of communication standards such as CDMA2000, GSM, IEEE 802.11 a/b/c/g/n, etc.

In operation, it is assumed, for the sake of conciseness of description, that the user, a visitor to the offices of the European Patent Office in The Hague, located at Patentlaan 2, Rijswijk, requires navigation assistance to the offices of TomTom International BV located at Rembrandtplein 35, Amsterdam.

In order to implement navigation to the above destination using the navigation apparatus 200, the user configures a route for calculation as follows. Referring to FIGS. 7 to 15, the user undertakes an illustrative destination location input process described hereinbelow using a location browser function supported by the user interface. Although not shown, the user uses a settings menu option supported by the application software 234 in order to select view generation in a three-dimensional mode.

Figure 7:
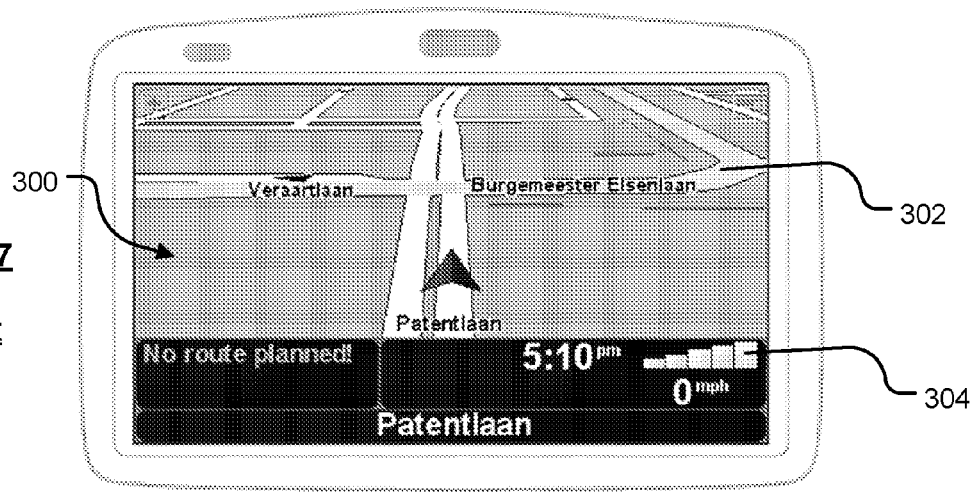
FIGS. 7 to 15 are screen shots of the navigation apparatus in relation to selection of a route associated with a proposed journey.

When the user powers-up the navigation apparatus 200, the GPS module 258 of the apparatus 200 acquires GPS data and performs a self-location determination by calculating (in a known manner) the current location of the navigation apparatus 200. The user is then presented, as shown in FIG. 7, with a display 300 showing in pseudo three-dimensions: a local environment 302 in which the navigation apparatus 200 is determined to be located and, in a region 304 of the display 300 below the local environment 302, a set of control and status messages.

Figure 8:
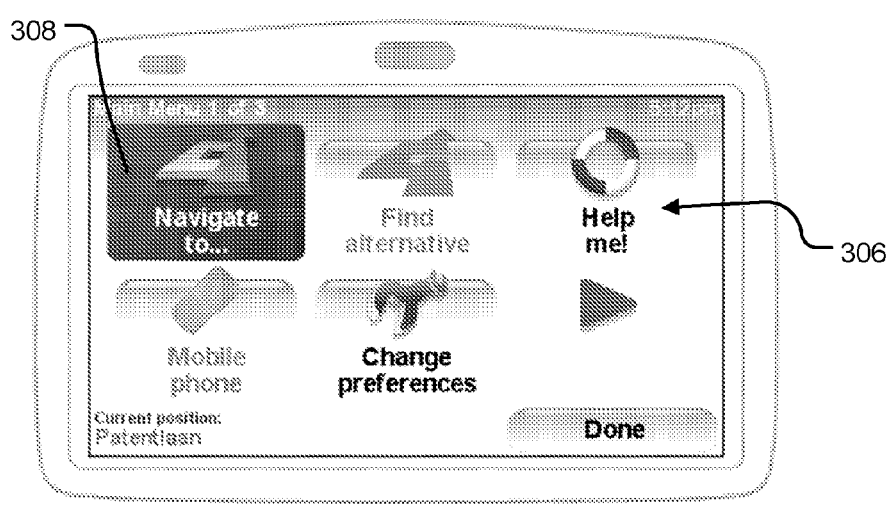

By touching the display at the local environment 302, the navigation apparatus 200, through the user interface, updates the display 300 by displaying (as shown in FIG. 8) a series of virtual or soft buttons 306 by means of which the user can, inter alia, input a destination to which the user wishes to navigate.

Figure 9:
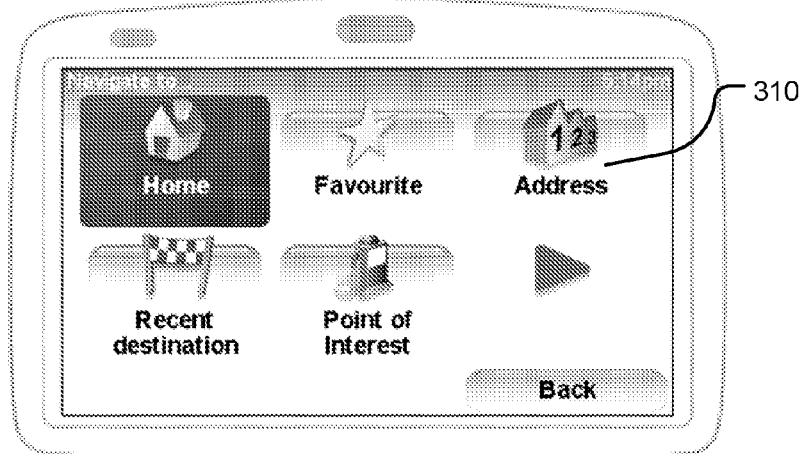

By touching the "Navigate to" virtual button 308, the navigation apparatus 200 initiates a route calculation procedure, a part of which comprises a route creation procedure. In accordance with the route creation procedure, the navigation apparatus 200 displays (as shown in FIG. 9) a plurality of virtual buttons that are each associated with a different category of selectable destinations. In this instance, the display shows a "home" button that if pressed would set the destination to a stored home location. The "favourite" button, if pressed, reveals a list of destinations that the user has previously stored in the navigation apparatus 200 and if one of these destinations is then selected the destination for the route to be calculated is set to the selected previously stored destination. The "Recent destination" soft button, if pressed, reveals a list of selectable destinations held in the memory of the navigation apparatus 200 and to which the user has recently navigated. Selection of one of the destinations populating this list would set the destination location for this route to the selected (previously visited) location. The "point of interest" button, if pressed, reveals a number of options by means of which a user can opt to navigate to any of a plurality of locations, such as Automatic Teller Machines (ATMs), petrol stations or tourist attractions for example, that have been pre-stored in the navigation apparatus 200 as locations to which a user of the navigation apparatus 200 might want to navigate to. A triangular arrow-like virtual button provides access to additional sub-menu options relating to the "Navigate to . . . " menu option, and an "address" button 310 commences a process by which the user can input the street address of the destination to which the user wishes to navigate.

Figure 10:
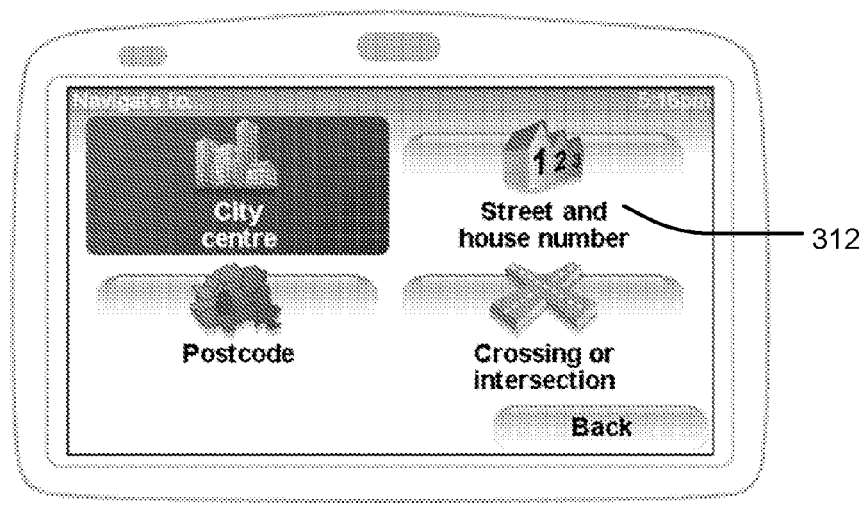

Since the user, in this example, knows the street address of the destination to which the user wishes the navigation apparatus 200 to navigate, it is assumed that the "address" button 310 is operated (by touching the virtual button displayed on the touchscreen) in order to select a location as the destination, whereupon (as shown in FIG. 10) the user is presented with a series of address input options: address input by "city centre", by "postcode", by "crossing or intersection" (for example a junction of two roads) and by "street and house number".

Figure 11:

In this example, the user knows the street address and house number of the destination and hence selects a "street and house number" virtual button 312 whereupon the user is then presented, as shown in FIG. 11, with: a prompt 314 to enter the name of the city to which they wish to navigate, a flag button 316 by means of which the user can select the country in which the desired city is located, and a virtual keyboard 318 that may be operated by the user, if necessary, to input the name of the destination city. In this instance the user begins to type the word "Amsterdam" and the navigation apparatus 200 therefore responds by providing the user with a list 320 of selectable cites.

Figure 12:
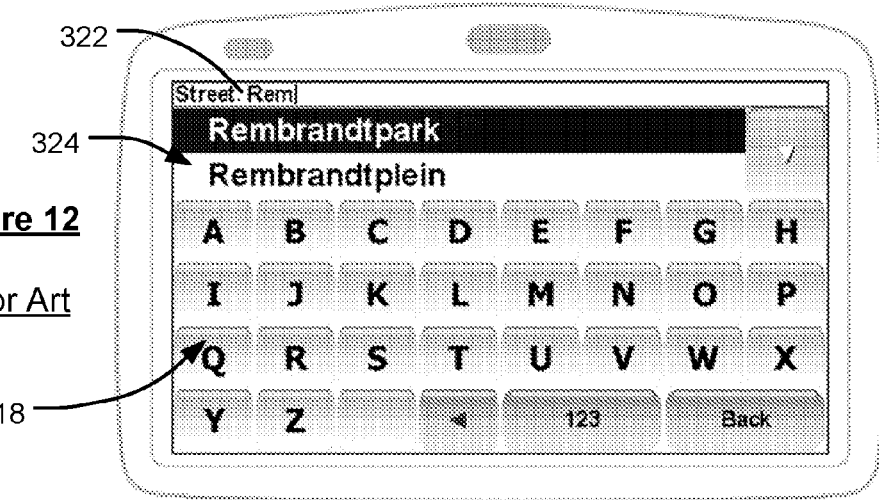
Figure 13:
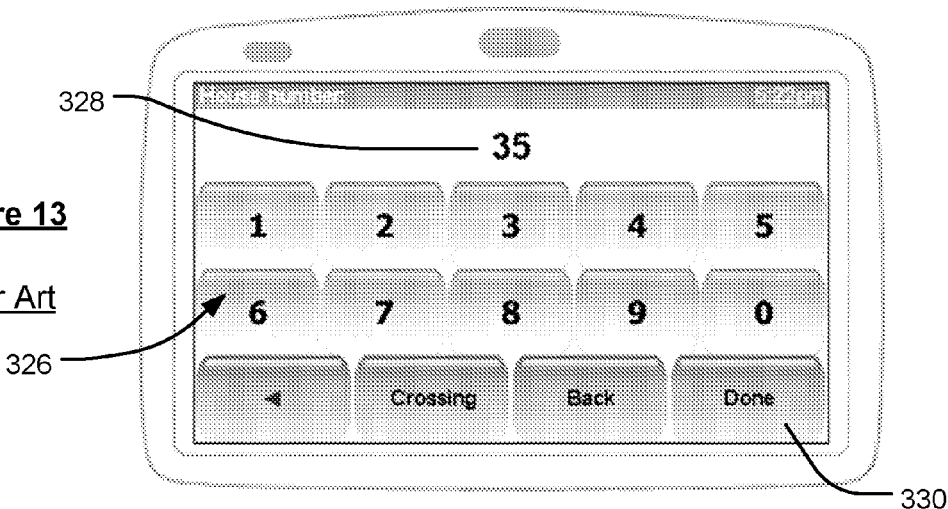
Figure 14:
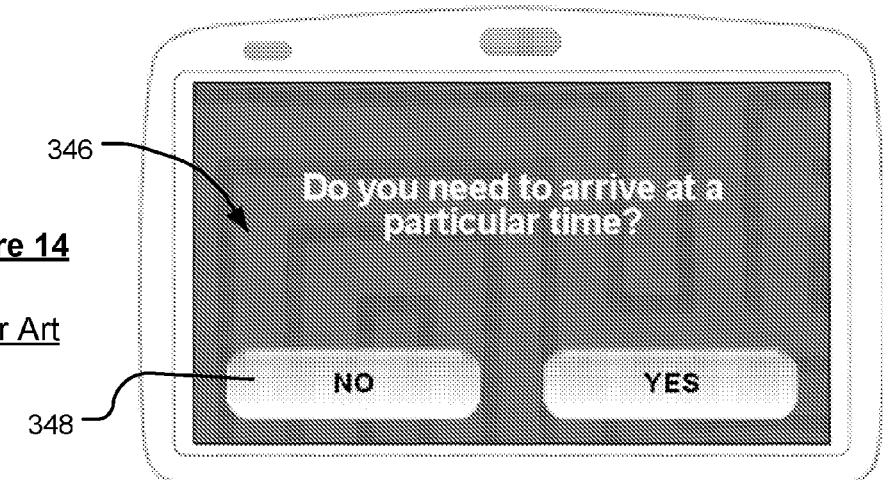

The user in this instance wishes to navigate to Amsterdam, and on selection of Amsterdam from the list 320 the navigation apparatus 200 displays, as shown in FIG. 12, the virtual keyboard 318 again by means of which the user can input street names, a prompt 322 for entry of a street name. In this instance, the user begins to type the name of the street in which the destination is located and the navigation apparatus 200 responds by providing the user with a list 324 of selectable street names.

In this example, the user wishes to travel to the street "Rembrandtplein" and so the user selects "Rembrandtplein" from the displayed list 324.

Once a street has been selected, the navigation apparatus 200 then displays (FIG. 13) a restricted, largely numeric, virtual keypad 326 and prompts the user, by means of prompt 328, to enter the street number in the selected street and city to which the user wishes to navigate. If the user has previously navigated to a building number in this street, then that number is initially shown. If, as in this instance, the user wishes to navigate to No. 35, Rembrandtplein, then the user simply needs to type the street number ("35") using the virtual keypad 326 and then touch a "done" virtual button 330 displayed at the bottom right hand corner of the display 300. If the user should wish to navigate to a different building number in Rembrandtplein, then all the user needs do is operate the virtual keypad 326 to input an appropriate building or street number.

In the event that the user decides that navigation to the building number suggested is required, the user touches the "Done" virtual button 330. The application software 266 then causes the user interface to present an interrogation message 346 (FIG. 14) asking the user whether a particular arrival time is required. If the user should touch a "yes" virtual button, then functionality is invoked that estimates the time required to travel to the destination (after provision by the user of the desired arrival time) and advises the user when they should leave (or if they are running late, should have left) their current location in order to arrive at their destination on time. In this instance, the user is not concerned about arriving at a particular time and hence selects a "no" virtual button 348.

Figure 15:
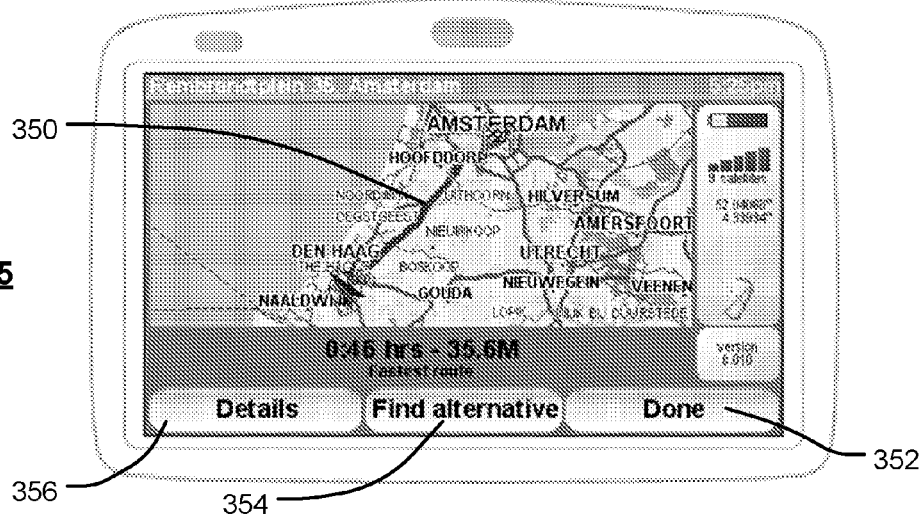

Selecting the "no" virtual button 348 causes the route calculator 250 of the navigation module 242 to calculate, using the geospatial data stored in the map database 254, a route between the current location and the selected destination, and to display a route 350 calculated, as shown in FIG. 15, on a relatively low magnification map that shows the entire route. The user is also provided with a "done" virtual button 352 which the user can press to indicate the calculated route is acceptable, a "find alternative" virtual button 354 that the user can press to cause the navigation apparatus 200 to calculate another route to the selected destination, and a "details" virtual button 356 that a user can press to reveal selectable options for the display of more detailed information concerning the currently displayed route 350.

In this instance, it is assumed that the user considers the displayed route acceptable, and once the "done" button 352 has been pressed the user is presented, with a three-dimensional view (not shown) of the current, start, location for the navigation apparatus 200. The user then commences their journey and the navigation apparatus 200 guides the user in the following manner.

In this regard, the GPS module 258 coupled to the route follower 256 provides current location information using data obtained from the GPS receiver 224. The route calculated by the route calculator 250 is accessible by the route follower 256 and the route follower 256 determines a current location with respect to the calculated route. When the current location on the route nears a location where the user has to execute a manoeuvre, for example within 1 kilometre of a node being approached on a road network or a deviation from a current road, the route follower sends an instruction to the instruction generator 260 to generate an instruction to the user. The instruction generator 260 has access to the map data and the route calculated.

Figure 16:
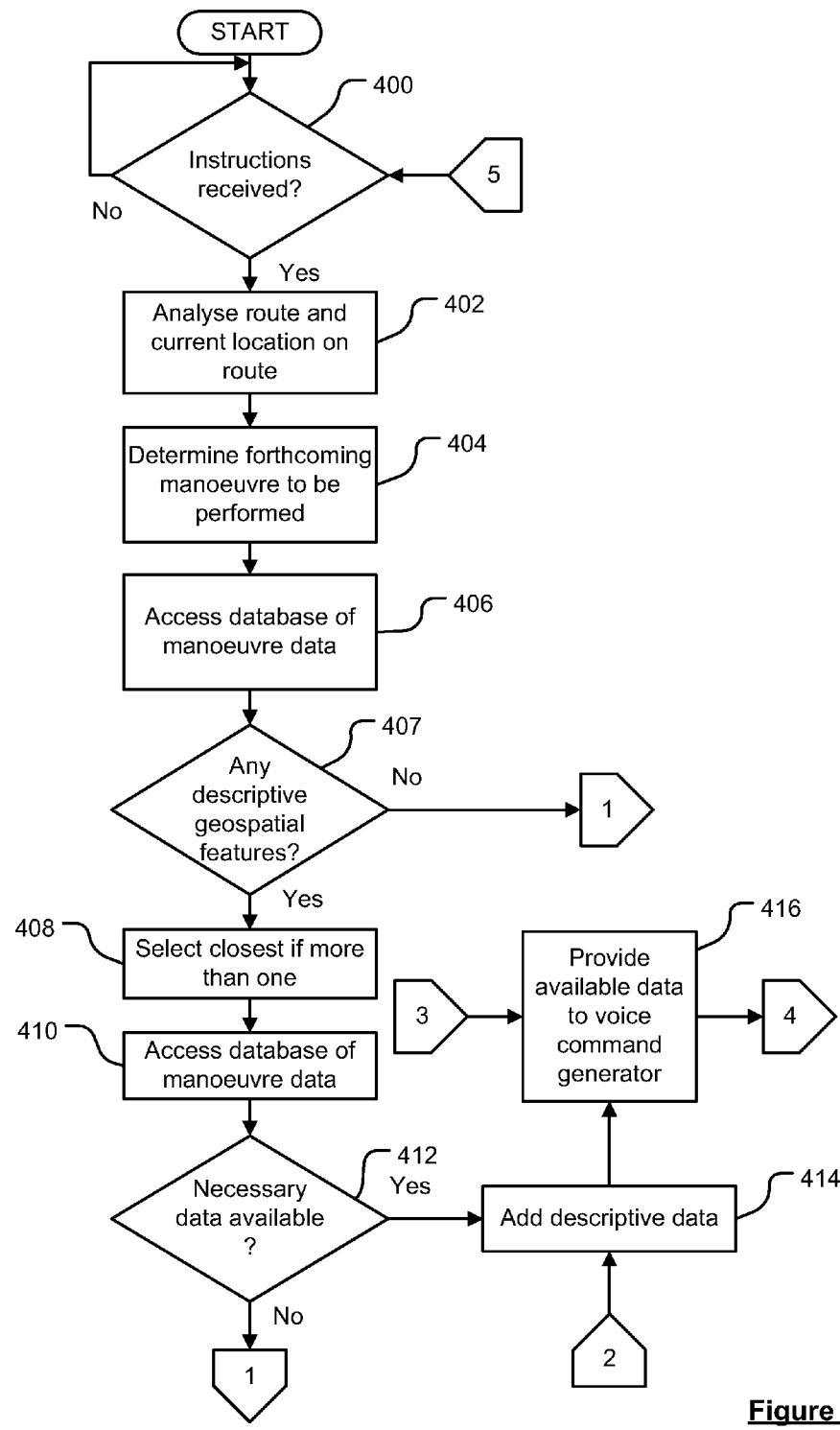
FIG. 16 is a first part of a flow diagram of a method of generating audible instructions using the apparatus of FIG. 2.

Referring to FIG. 16, the instruction generator 260 awaits (Step 400) receipt of the instruction from the route follower 260, and upon receipt of the instruction the instruction generator 260 analyses (Step 402) the route calculated and the current location of the user in the route in order to determine (Step 404) a forthcoming manoeuvre to be performed using any suitable known technique for determining the forthcoming manoeuvre. In this respect, in order not to distract from the salient parts of this example, further details of how the instruction generator 260 determines the forthcoming manoeuvre shall not be described herein.

Once the forthcoming manoeuvre has been determined, the instruction generator 260 accesses (Step 406) the local database of manoeuvre data 262 in order to extract sub-components of route manoeuvre instruction component data, for example distance and activity and any attributes of the activity, such as 1 kilometre + turn + left or 1 kilometre + roundabout + third exit. This data constitutes route manoeuvre instruction component data of manoeuvre data. The route manoeuvre component data relates to manoeuvres to be executed in respect of a category of information, for example a transportation or navigation network, such as roads, junctions, intersections, roundabouts and/or paths.

The instruction generator 260 then determines (Step 407) whether any "descriptive" geospatial data exists that can be used to supplement the route manoeuvre instruction component data in order to enhance factual clarity thereof and/or provide increased guidance in relation to the manoeuvre to be executed. The descriptive geospatial data relates to the environment where the manoeuvre is to be executed, for example surrounding or neighbouring geospatial features, the mention of which would enhance comprehension of the manoeuvre to be executed. The descriptive geospatial data serves to supplement the identification of any geospatial features of the route manoeuvre instruction component data in a non-repetitive manner. In this respect, the instruction generator 260 determines the location for the manoeuvre and analyses the content of the map database 254 in order to identify any geospatial features that are in the vicinity of the location for the manoeuvre, for example within a predetermined distance of the location, such as between about 5 and about 50 metres. An example of a geospatial feature is a Point of Interest or a shop or other concern, such as a restaurant. In the event that more than one geospatial feature exists within the predetermined distance, the instruction generator 260 selects (Step 408) the geospatial feature closest to the location for the manoeuvre. Optionally, the instruction generator 260 can be configured to select a geospatial feature located in a most appropriate location relative to the location for the manoeuvre, for example if a manoeuvre is a right turn, a geospatial feature located on the right hand side of the road can be selected in preference to a geospatial feature closer to the location of the forthcoming manoeuvre, but located on the left hand side of the road. Additionally, if stored in the map database 254, three-dimensional data and/or texture information can be used to infer physical attributes of the geospatial feature, for example relating to a dimension of the geospatial feature such as a "tall" building. Similarly, the texture information can be used in an analogous manner to describe the geospatial structure, for example a "red brick" building. Of course, the texture characteristics of colour and material from which the exterior of the building is constructed need not be used in combination and can be used alone or in combination with other descriptive characteristics relating to the geospatial feature.

Thereafter, the instruction generator 260 accesses (Step 410) the local database of manoeuvre data 262 in order to extract sub-component data of supplementary descriptive instruction component data, for example a relative position of the geographic feature to the location of the forthcoming manoeuvre, such a "before", "after" or "next to", or physical attribute data relating to the geospatial feature, such as "tall". Also, the local database of manoeuvre data 262 can optionally be used to summarise the nature of three-dimensional data, for example "building". However, in the event that the instruction generator 260 determines (Step 412) that the map database 254 does not contain any information or sufficient information concerning the physical attributes of the geospatial feature identified, the assistance of the external source interface module 264 can be sought by the instruction generator 260 in the manner to be described shortly hereinafter.

If, however, the instruction generator 260 is able to obtain sufficient information concerning the geospatial feature, including for example, a physical attribute of the geospatial feature selected, the instruction generator 260 integrates (Step 414) the route manoeuvre instruction component data and the supplementary descriptive instruction component data, for example 1 kilometre + turn + left + before + tall + building. The available manoeuvre data is passed (Step 416) to the voice command generator 266, the operation of which will be described later herein.

In the event that instruction generator 260 determines (Step 407) that the map database 254 does not contain any or sufficient information relating to the geospatial features in the vicinity of the location of the forthcoming manoeuvre, the instruction generator 260 can again enlist the assistance of the external source interface module 264.

Figure 17:
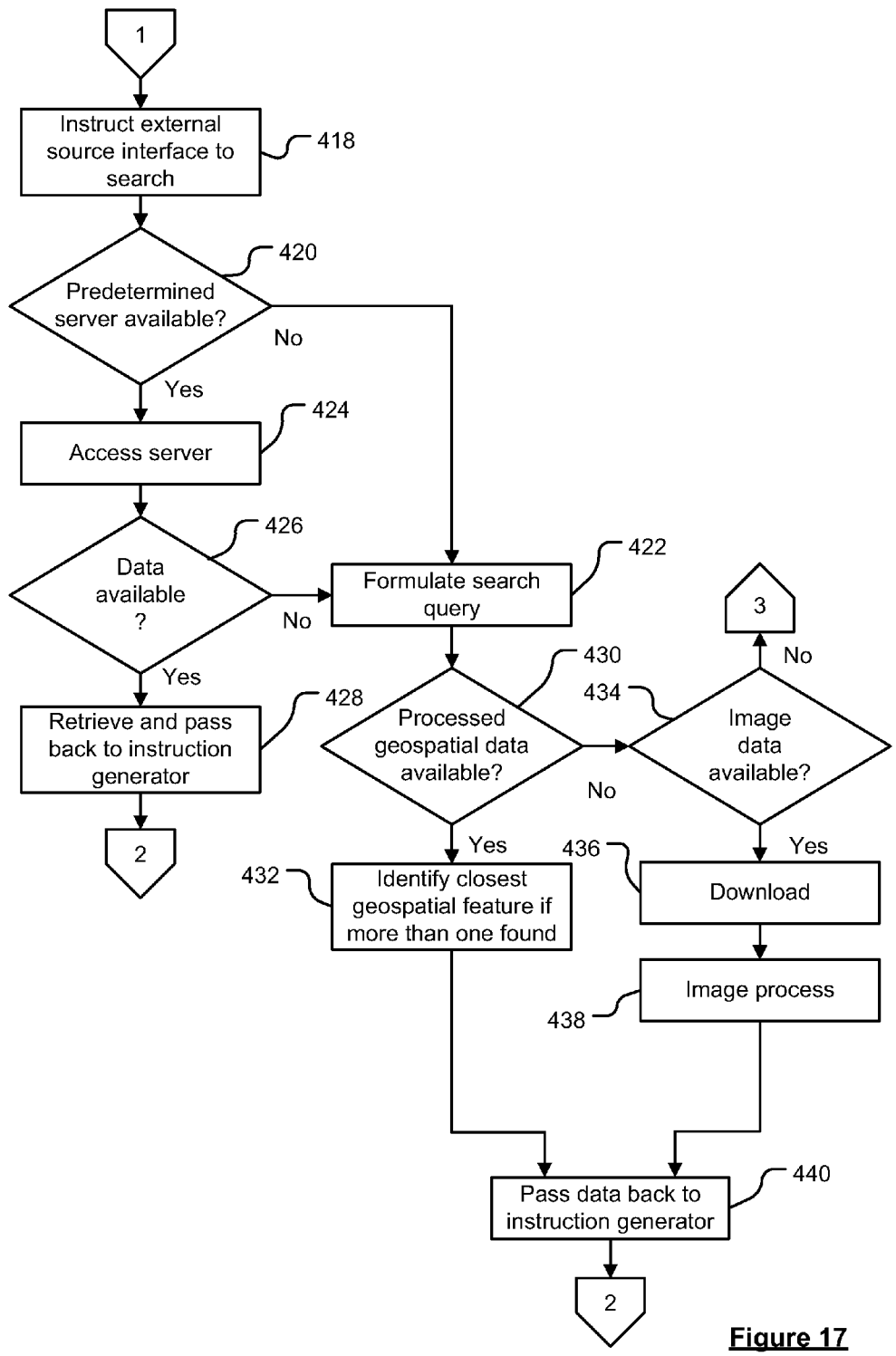
FIG. 17 is a second part of the flow diagram of FIG. 16.

In this regard (FIG. 17), the instruction generator 260 instructs the external source interface module 264 to use the external resource 270 to try to identify and obtain information concerning a suitable geospatial feature or a physical attribute of one or more already-identified geospatial features. The external source interface module 264 then determines (Step 420) whether a predetermined server, for example a server of geospatial data, is available, such as the first remote server 286. In the event that the external source interface module 264 has been preconfigured with the identity of the first remote server 286, the external source interface module 264 interrogates the first remote server 286 in order to determine (Step 426) whether any data is available. In the event that sub-component data of supplementary descriptive information component data is available, the data obtained by the external source interface module 264 is passed (Step 428) to the instruction generator 260 and the instruction generator 260 integrates (Step 414) the route manoeuvre instruction component data and the supplementary descriptive instruction component data in the manner already described above. The available manoeuvre data is then passed (Step 416) to the voice command generator 266, the operation of which will, as mentioned above, be described later herein.

Alternatively, in the event that the external source interface module 264 is not configured with the identity of the first remote server 286 or the first remote server 286 is unable to provide geospatial feature information required (Steps 420, 426), the external source interface module 264 formulates (Step 422) a search query and submits the search query to the search engine, for example the Google™ search engine, supported by the second remote server 288 in order to obtain geospatial feature data. The external source interface module 264 then awaits a response from the search engine and determines (Step 430) whether the search engine has returned information concerning a geospatial feature in the vicinity of the location of the forthcoming manoeuvre to be executed. If the purpose of using the search engine is to identity data concerning more than one already-identified geospatial feature, the geospatial features can all be searched. Where identification of a suitable geospatial feature is required, if the search engine returns information concerning more than one the geospatial feature, or more than one geospatial feature has already been identified, the external source interface module 264 selects a geospatial feature closest (Step 432) to the location of the forthcoming manoeuvre or applies another suitable criterion in the manner already described above in relation to the existence of multiple candidate geospatial features. In order to obtain sub-component data of the supplementary descriptive instruction component data, if the data returned by the search engine comprises insufficient or no sub-component data, the external source interface module 264 can "follow" any links to resources accessible via the Internet 284 and parse web pages, if appropriately provisioned, in order to obtain the sub-component data. The sub-component data of supplementary descriptive instruction component data obtained by the external source interface module 264 is passed (Step 440) to the instruction generator 260 and the instruction generator 260 integrates (Step 414) the route manoeuvre instruction component data and the supplementary descriptive instruction component data in the manner described above. The available manoeuvre data is then passed (Step 416) to the voice command generator 266, the operation of which will be described later herein.

In the event, that the search engine does not return an identity of a geospatial feature and associated information concerning the geospatial feature, or where searching of the already-identified geospatial features does not return any links to sub-component data, the external source interface module 264 queries the search engine in order to determine (Step 434) whether any images associated with the location of the forthcoming manoeuvre can be obtained. If no images are available to the external source interface module 264 in relation to the location where the forthcoming manoeuvre is to be executed, any available manoeuvre data is passed (Step 416) by the instruction generator 266 to the voice command generator 266, the operation of which will be described later herein. Typically, in such examples, the manoeuvre data simply comprises only route manoeuvre instruction component data. Alternatively, if image data is available, the image data is downloaded (Step 436) by the external source interface module 264 and passed to the image processing engine 268, where the downloaded image data is analysed (Step 438) in order to identify one or more geospatial features, for example a building or a monument or a body of water. If a geospatial feature and any physical attributes thereof are identified by the image processing engine 268, the image processing engine 268 passes (Step 440) the geospatial feature information including any physical attribute information in the form of sub-component data of supplementary descriptive instruction component data to the instruction generator 260 via the external source interface module 264, and the instruction generator 260 integrates (Step 414) the route manoeuvre instruction component data and the supplementary descriptive instruction component data (if any) in the manner described above. The available manoeuvre data is then passed (Step 416) to the voice command generator 266.

In another embodiment, in the event that the navigation apparatus 200 is operably coupled to an image capture device, for example a digital camera, or comprises the image capture device, an image can be captured by the image capture device for analysis by the image processing engine 268 in respect of the location where capture took place in the manner described above in addition to or as an alternative to obtaining one or more images by download via the Internet 284.

In a further embodiment, supplementary descriptive instruction component data derived from an image obtained by the external source interface module 264 and/or via the image capture device and associated location data can be communicated by the external source interface module 264 to the first remote server 286 for use by other navigation apparatuses and hence benefit other users. Consequently, the information can be shared. If desired, the image obtained can also or alternatively be communicated to the first remote server 286 with the location data. Additionally or alternatively, the supplementary descriptive instruction component data obtained and/or the image can be stored locally by the navigation apparatus 200 for subsequent use. In yet a further embodiment, any user-generated content, for example a user-designated POI, can constitute the geospatial feature and can be communicated to the first remote server 286. Similarly, it should be understood that map update content can be uploaded by the navigation apparatus 200 to the first remote server 286 for use by other users as the geospatial feature in relation to the provision of voice instructions as described above. In another example, additionally or alternatively, the geospatial feature can be derived from traffic data, for example traffic event data, such as a permanently or temporarily closed road.

Figure 18:
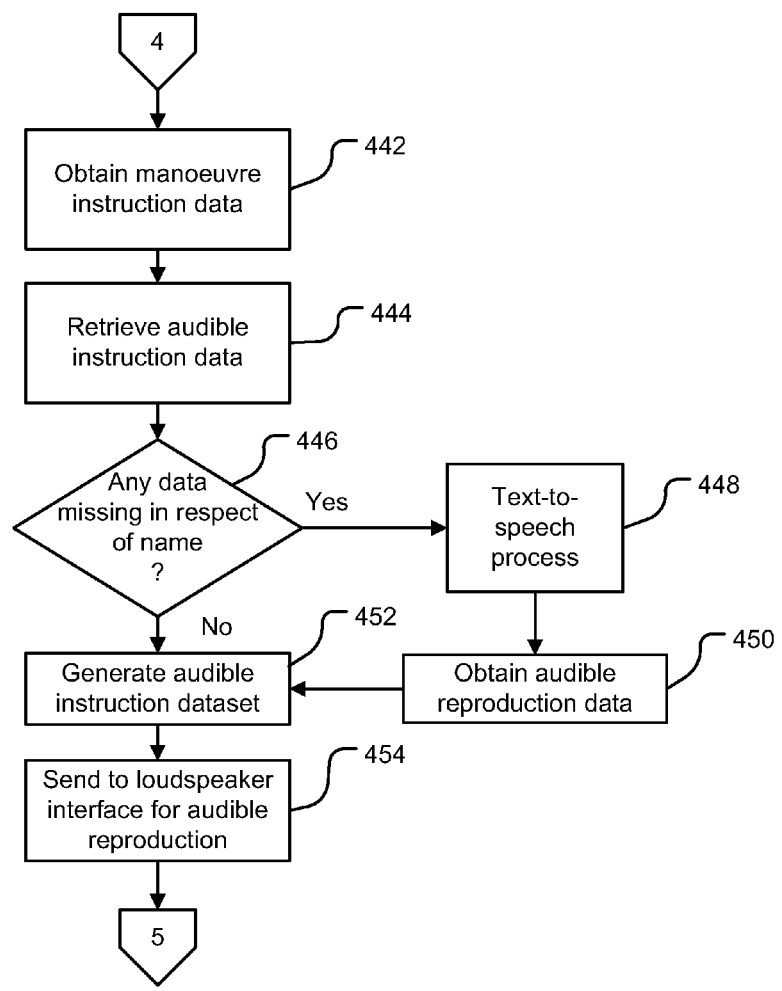
FIG. 18 is a third part of the flow diagram of FIG. 17.

Turning to FIG. 18, the manoeuvre instruction data is received (Step 442) by the voice command generator 266 and the voice command generator 266 accesses (Step 444) the voice data database 272 in order to translate the manoeuvre instruction data into voice instruction data for subsequent processing before conversion into audible information. To this end, the voice command generator 266 determines (Step 446) whether the voice data database 272 is able to provide all voice instruction data relating to the manoeuvre instruction data. If all the voice instruction data is obtainable from the voice data database 272, then the voice command generator 266 continues to construct (Step 452) an audible instruction dataset, namely data that can be received by the loudspeaker interface 274 for reproduction by the loudspeaker 276. Alternatively, if the voice command generator 266 encounters manoeuvre instruction data that is not translatable using the voice data database 272, then if the manoeuvre instruction data that cannot be translated is a name, for example, the name text is passed to the text-to-speech engine 267 of the voice command generator 266 and corresponding audible reproduction data is generated by the text-to-speech engine 267. Thereafter, the voice command engine 266 obtains (Step 450) audible reproduction data generated by the text-to-speech engine 267 and incorporates the audible reproduction data into the voice instruction data already retrieved from the voice data database 272 and continues to construct (Step 452) the audible instruction dataset as described above. Thereafter, the voice command generator 266 sends (Step 454) the audible instruction dataset to the loudspeaker interface 274, which drives the loudspeaker 276, the loudspeaker reproducing the audible instruction dataset as an audible voice instruction. For example, the audible instruction can be "In 100 metres, after the tall red brick building to your right, turn right". Similarly, in the event that traffic information is used in the manner described above, the audible instruction can be "Before the closed road ahead, turn left" or "Before the traffic jam, turn right".

The navigation module 242 then reverts to the instruction generator 260 awaiting a further instruction from route follower 256 in relation to generation of another voice instruction.

Using the current location information calculated, the navigation apparatus 200, in a known manner, also updates the visual map in accordance with determined changes in location of the navigation apparatus 200, and guides the user by providing visual and the audible navigation instructions until the destination selected is approaching or reached.

In another embodiment, the voice command generator 266 can be arranged to permit recorded of voice clips constituting an audible voice instruction, for example "After the museum, turn left". The voice clip can be stored by the navigation apparatus 200 for subsequent use and/or communicated by the external source interface module 264 to the first remote server 286 for use by other navigation apparatuses and hence benefit other users.

It should be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, although in the above examples, the geospatial feature is selected with reference to the location of the forthcoming manoeuvre, the instruction generator 260 can also select the geospatial feature based upon the current location of the navigation apparatus 200 and the location of the forthcoming manoeuvre. In this regard, the current location of the navigation apparatus 200 can be used as a criterion for selection of the geospatial feature where a number of geospatial features exist from which a selection has to be made. For example, the geospatial feature nearer the navigation apparatus can be more easily visible to a user than other candidate geospatial features.

As another example, although the above embodiments have been described in the context of driving, the skilled person should appreciate that the above examples can be employed in relation to other activities, for example walking or hiking or other off-road navigation.

By way of further example, whilst embodiments described in the foregoing detailed description refer to GPS, it should be noted that the navigation apparatus may utilise any kind of position sensing technology as an alternative to (or indeed in addition to) the GPS. For example the navigation apparatus may utilise other global navigation satellite systems (GNSS) such as the proposed European Galileo system when available. Equally, it is not limited to satellite based but could readily function using ground based beacons or any other kind of system that enables the device to determine its geographic location, for example the long range navigation (LORAN)-C system.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A navigation apparatus comprising:
a processing resource arranged to support an operating environment;
a route follower supported by the operating environment and arranged to monitor progression, when in use, along a route to be followed;
an instruction generator supported by the operating environment and arranged to determine an identity of a location in advance of the location being reached where a manoeuvre has to be executed in order to continue following the route, and to generate manoeuvre data in relation to the manoeuvre;
an image processing engine arranged to recognize a geospatial feature in one or more images associated with the location of a forthcoming manoeuvre and to pass information associated with the geospatial feature to the instruction generator; and
a voice command generator supported by the operating environment and arranged to obtain the manoeuvre data and to generate in response to the manoeuvre data voice instruction data for reproduction by a loudspeaker as an audible voice instruction;
wherein the manoeuvre data comprises route manoeuvre instruction component data and supplementary descriptive instruction component data, the supplementary descriptive instruction component comprising the information associated with the geospatial feature.

2. An apparatus as claimed in claim 1, wherein the instruction generator is arranged to identify the geospatial feature relating to the location of the forthcoming manoeuvre by identifying a geospatial feature relating to the location such that the geospatial feature supplements any geospatial features identified in the route manoeuvre instruction component data in a non-repetitive manner.

3. An apparatus as claimed in claim 1, wherein the geospatial feature has a category of information associated therewith, the category of information being a non-transportation or navigation network category.

4. An apparatus as claimed in claim 1, wherein the instruction generator is arranged to determine a physical attribute of the geospatial feature.

5. An apparatus as claimed in claim 4, wherein the physical attribute relates to a dimension of the geospatial feature.

6. An apparatus as claimed in claim 4, wherein the physical attribute is derived from at least one of three-dimensional data and texture data associated with the geospatial feature.

7. An apparatus as claimed in claim 1, further comprising an external source interface module for procuring geospatial feature data stored externally to the navigation apparatus.

8. An apparatus as claimed in claim 7, wherein the external source interface module is arranged to generate a search query in order to find a geospatial feature associated with the location of the forthcoming manoeuvre.

9. An apparatus as claimed in claim 7, wherein the external source interface module is arranged to download Point of Interest data.

10. An apparatus as claimed in claim 7, wherein the external source interface module is arranged to download an image associated with the location of the forthcoming manoeuvre.

11. An apparatus as claimed in claim 1, wherein the image processing engine is arranged to determine a physical attribute of the recognised geospatial feature.

12. An apparatus as claimed in claim 11, wherein the physical attribute relates to a dimension of the geospatial feature.

13. An apparatus as claimed in claim 11, wherein the physical attribute is derived from at least one of three-dimensional data and texture data associated with the geospatial feature.

14. An apparatus as claimed claim 1, further comprising a text-to-speech engine arranged to translate a name associated with the geospatial feature into audible reproduction data when predefined audible reproduction data is not available in relation to the name associated with the geospatial feature.

15. An apparatus as claimed in claim 1, further comprising an image capture device arranged to capture an image associated with the location of the forthcoming manoeuvre.

16. A method of providing voice instructions for a navigation apparatus, the method comprising:
monitoring, by a processing resource, progression along a route to be followed;
determining, by an instruction generator, an identity of a location in advance of the location being reached where a manoeuvre has to be executed in order to continue following the route;
obtaining, by an external source interface module, one or more images associated with the location of a forthcoming manoeuvre;
recognizing, by an image processing engine, a geospatial feature in the one or more images;
generating, by the instruction generator, manoeuvre data in relation to the manoeuvre;
obtaining, by a voice generator, the manoeuvre data; and
generating, by the voice generator, in response to the manoeuvre data voice instruction data for reproduction by a loudspeaker as an audible voice instruction;
wherein the manoeuvre data comprises route manoeuvre instruction component data and supplementary descriptive instruction component data, the supplementary descriptive instruction component data comprising information associated with the recognized geospatial feature.

17. A non-transitory computer readable medium comprising a computer program element having computer program code means to make a computer execute a method of providing voice instructions for a navigation apparatus, the method comprising:
monitoring progression along a route to be followed;
determining an identity of a location in advance of the location being reached where a manoeuvre has to be executed in order to continue following the route;
obtaining one or more images associated with the location of a forthcoming manoeuvre;
recognizing a geospatial feature in the one or more images
generating manoeuvre data in relation to the manoeuvre;
obtaining the manoeuvre data; and
generating in response to the manoeuvre data voice instruction data for reproduction by a loudspeaker as an audible voice instruction;
wherein the manoeuvre data comprises route manoeuvre instruction component data and supplementary descriptive instruction component data, the supplementary descriptive instruction component data comprising information associated with the recognized geospatial feature.

* * * * *